United States Patent
Ogane (10) Patent No.: US 10,647,160 B2
(45) Date of Patent: May 12, 2020

(54) PNEUMATIC TIRE (71) Applicant: BRIDGESTONE CORPORATION, Chuo-ku, Tokyo (JP)

(72) Inventor: Shun Ogane, Kodaira (JP)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 1070 days.

(21) Appl. No.: 14/773,858

(22) PCT Filed: Mar. 13, 2014

(86) PCT No.: PCT/JP2014/057631
§ 371 (c)(1),
(2) Date: Sep. 9, 2015

(87) PCT Pub. No.: WO2014/142346
PCT Pub. Date: Sep. 18, 2014

(65) Prior Publication Data
US 2016/0023519 A1    Jan. 28, 2016

(30) Foreign Application Priority Data
Mar. 13, 2013 (JP) ................................ 2013-050487

(51) Int. Cl.
*B60C 11/03* (2006.01)
*B60C 11/13* (2006.01)
*B60C 11/12* (2006.01)

(52) U.S. Cl.
CPC ........ *B60C 11/0327* (2013.01); *B60C 11/032* (2013.01); *B60C 11/0306* (2013.01);
(Continued)

(58) Field of Classification Search
CPC ............. B60C 11/1281; B60C 11/1218; B60C 11/0327; B60C 11/1307; B60C 11/0306;
(Continued)

(56) References Cited

U.S. PATENT DOCUMENTS

2011/0005652 A1* 1/2011 Ono .................... B60C 11/0309
152/209.18
2014/0224395 A1* 8/2014 Kawakami .......... B60C 11/0306
152/209.18

FOREIGN PATENT DOCUMENTS

EP       2251214 A1    11/2010
EP       2311656 A1     4/2011
(Continued)

OTHER PUBLICATIONS

Machine translation of JP2007-230399 (no date).*
(Continued)

*Primary Examiner* — Steven D Maki
*Assistant Examiner* — Philip N Schwartz
(74) *Attorney, Agent, or Firm* — Kenja IP Law PC (57) ABSTRACT

A pneumatic tire can improve the heat dissipation effect in the tread portion while guaranteeing land portion rigidity and can also suppress degradation of the heat dissipation effect. The pneumatic tire includes a narrow groove (10) on a tread surface (1), extending at an inclination to the tire circumferential direction, the groove width (W1) being smaller than the groove depth (D1), an air inflow part (11) opening to the tread surface (1) and formed on at least one of the groove walls (10c) of the narrow groove (10) that face each other in the tire circumferential direction, and a wear prevention portion (12) formed by a protrusion or concavity on a groove wall (10c) that faces the other groove wall (10c) on which the air inflow part (11) is formed or on the tread surface (1) connecting to the groove wall (10c) that faces the other groove wall (10c).

7 Claims, 8 Drawing Sheets

(52) U.S. Cl.
CPC ...... *B60C 11/1307* (2013.01); *B60C 11/1376* (2013.01); *B60C 11/1392* (2013.01); *B60C 2011/0339* (2013.01); *B60C 2011/0388* (2013.01); *B60C 2011/1209* (2013.01); *B60C 2011/133* (2013.01); *B60C 2011/1338* (2013.01); *B60C 2200/14* (2013.01)

(58) Field of Classification Search
CPC ............... B60C 11/032; B60C 11/1392; B60C 11/1376; B60C 2011/0339; B60C 2011/133; B60C 2011/1338; B60C 2011/0388; B60C 2011/1209; B60C 2200/14

See application file for complete search history.

(56) References Cited

FOREIGN PATENT DOCUMENTS

| EP | 2455234 A1 | 5/2012 | | |
|---|---|---|---|---|
| EP | 2455235 A2 | 5/2012 | | |
| JP | H05-096913 A | 4/1993 | | |
| JP | H08332810 A | 12/1996 | | |
| JP | 11105512 A | * 4/1999 | ......... | B60C 11/1218 |
| JP | H11-105512 A | 4/1999 | | |
| JP | 2003-205706 A | 7/2003 | | |
| JP | 2004-098982 A | 4/2004 | | |
| JP | 2007-191093 A | 8/2007 | | |
| JP | 2007230399 A | 9/2007 | | |
| JP | 2007230399 A | * 9/2007 | ......... | B60C 11/0311 |
| JP | 2009-227264 A | 10/2009 | | |
| JP | 2010095036 A | * 4/2010 | ............ | B60C 11/12 |
| JP | 2010095036 A | 4/2010 | | |
| JP | 2011140254 A | 7/2011 | | |
| JP | 2012-001154 A | 1/2012 | | |
| JP | 2013-018443 A | 1/2013 | | |
| JP | 2013-086563 A | 5/2013 | | |
| WO | 2009107436 A1 | 9/2009 | | |
| WO | 2013/035889 A1 | 3/2013 | | |

OTHER PUBLICATIONS

Machine translation of JP2010-095036 (no date).*
Machine translation of JP11-105512 (no date).*
Jun. 10, 2014 International Search Report issued in International Patent Application No. PCT/JP2014/057631.
Feb. 25, 2014, Notification of Reasons for Refusal issued by the Japan Patent Office in the corresponding Japanese Patent Application No. 2013-050487.

* cited by examiner

FLOW RATE [Km/h]

PNEUMATIC TIRE

TECHNICAL FIELD

This disclosure relates to a pneumatic tire with an improved heat dissipation effect in the tread.

BACKGROUND

When a tire rotates with load applied thereon, the tread portion generates heat and reaches a high temperature, which leads to various types of failure such as heat separation of the tread portion. In order to lower the temperature of the tread portion, it is necessary to reduce heat generation or improve heat dissipation.

Conventionally, in order to lower the temperature of the tread portion, one method has been to form grooves in the tread portion, thereby removing tread rubber that is the source of heat generation and increasing the surface area of the tread portion, which increases heat dissipation (for example, see JP 2003-205706 A (PTL 1)).

CITATION LIST

Patent Literature

PTL 1: JP 2003-205706 A

SUMMARY

Technical Problem

It is difficult, however, for air to flow into a groove that has a narrow width and that extends in the tire width direction. In order to further improve the effect of lowering temperature, it is also necessary to increase the number of grooves, yet increasing the number of grooves leads to a reduction in land portion rigidity, causing wear performance and steering stability to worsen. Therefore, it could be useful to provide a pneumatic tire that can improve the heat dissipation effect in the tread portion while guaranteeing land portion rigidity and that can also suppress degradation of the heat dissipation effect.

Solution to Problem

An exemplary pneumatic tire for resolving the above problems includes: a narrow groove formed on a tread surface; an air inflow part, one end of the air inflow part opening to one of the groove walls of the narrow groove that face each other in the tire circumferential direction, and the other end of the air inflow part opening to the tread surface; and a wear prevention portion formed by a protrusion or a concavity on a groove wall, of the narrow groove, that faces the air inflow part or on the tread surface connecting to the groove wall that faces the groove wall on which the air inflow part is formed.

Advantageous Effect

According to this disclosure, a pneumatic tire that can improve the heat dissipation effect in the tread portion while guaranteeing land portion rigidity and that can also suppress degradation of the heat dissipation effect can be provided.

DETAILED DESCRIPTION

Embodiments will be described below with reference to the drawings.

Figure 1A:
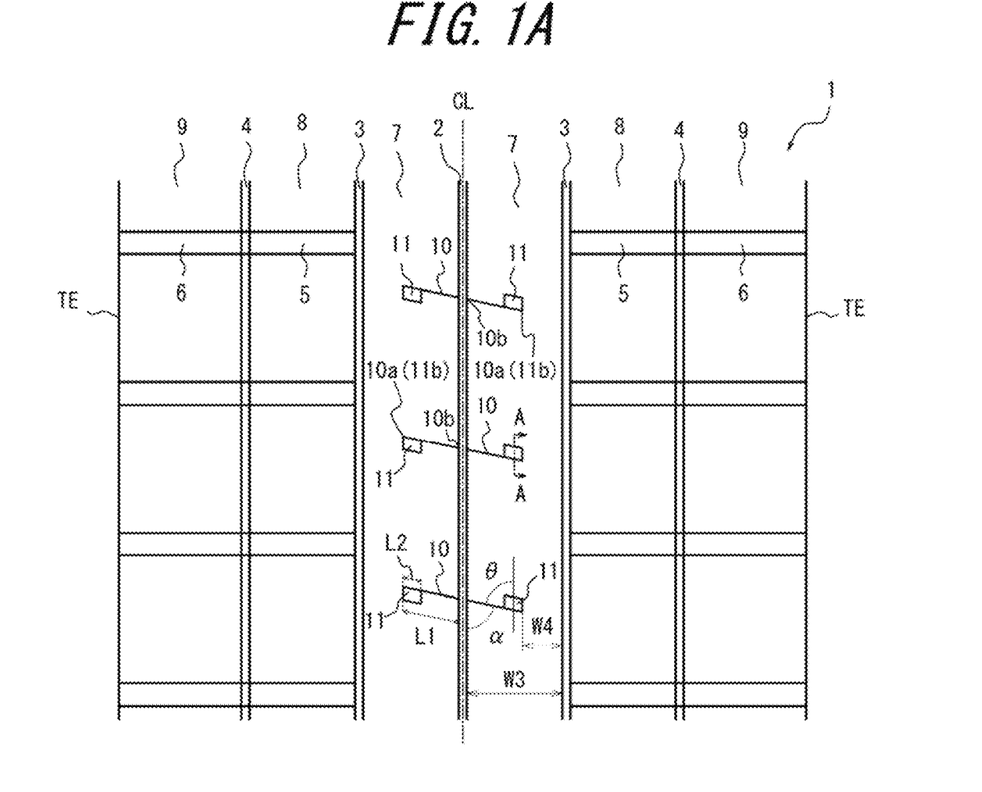
FIG. 1(a) is a development view of the tread pattern in a pneumatic tire according to one of the disclosed embodiments.

FIG. 1(a) is a development view of an example of the tread pattern in a pneumatic tire according to an exemplary embodiment. The following are formed on a tread surface 1: a central circumferential groove 2 that extends along the tire circumferential direction on the tire equatorial plane CL; a pair of intermediate circumferential grooves 3, one on either side of the central circumferential groove 2, that extend along the tire circumferential direction; a pair of outer circumferential grooves 4 that extend along the tire circumferential direction on the outside, in the tire width direction, of the intermediate circumferential grooves 3; intermediate width direction grooves 5 that extend along the tire width direction and are in communication with the intermediate circumferential grooves 3 and the outer circumferential grooves 4; and outer width direction grooves 6 that extend along the tire width direction, are in communication with the outer circumferential grooves 4, and extend to a tread surface end TE.

A pair of rib-shaped central land portions 7, one on either side of the tire equatorial plane CL, are formed by the central circumferential groove 2 and the intermediate circumferential grooves 3. Block-shaped central land portions 8 are formed by the intermediate circumferential grooves 3, outer circumferential grooves 4, and intermediate width direction grooves 5. Block-shaped outer land portions 9 are formed by the outer circumferential grooves 4 and outer width direction grooves 6. The tread pattern in the diagrams is only an example, and this disclosure is also applicable to a rib-based pattern, a block-based pattern, or any other type of tread pattern. The intermediate width direction grooves 5 and the outer width direction grooves 6 may be inclined with respect to the tire width direction, and the groove width thereof may vary instead of being constant. Furthermore, the outer width direction grooves 6 need not be in communication with the tread surface end TE.

Figure 1B:
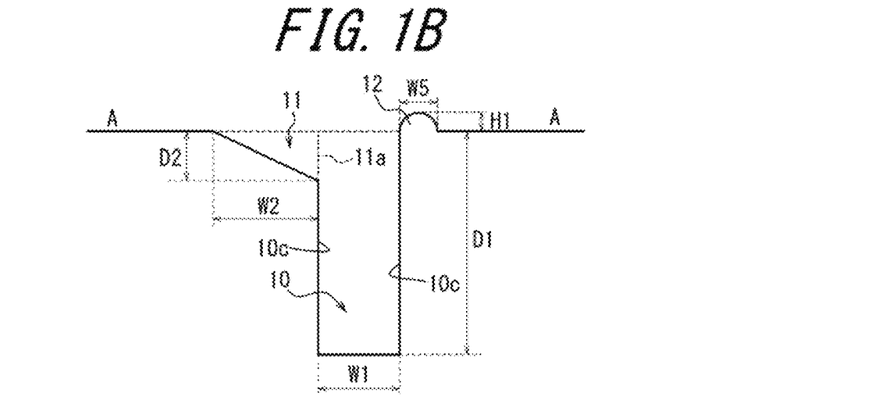
FIG. 1(b) is a cross-sectional diagram along the A-A line in FIG. 1(a)

Narrow grooves 10 extending at an inclination with respect to the tire circumferential direction are formed in the rib-shaped central land portions 7. One end 10a of each narrow groove 10 terminates in the rib-shaped central land portion 7, and the other end 10b opens into the central circumferential groove 2. As illustrated in FIG. 1(b), the groove width W1 of the narrow groove 10 in a cross-section along the A-A line of FIG. 1(a) (a cross-section along the tire circumferential direction) is smaller (narrower) than the groove depth D1. In the illustrated example, the groove width W1 is taken as the width in the tire circumferential direction.

In the pneumatic tire of the illustrated embodiment, an air inflow part 11 that opens to the tread surface 1 is formed on one of the groove walls 10c, of the narrow groove, that face each other in the tire circumferential direction. In other words, the air inflow part 11 connects the groove wall 10c and the tread surface 1, with one end opening to the groove wall 10c and the other end opening to the tread surface 1. The tread surface 1 (in this example, the surface of the rib-shaped central land portion 7) connecting to the groove wall 10c, of the narrow groove 10, that faces the air inflow part 11 also has a wear prevention portion 12 formed by a protrusion. In this example, the wear prevention portion 12 is a protrusion, with a generally semicircular cross-sectional shape, that projects outward in the tire radial direction from the tread surface 1 and extends continuously along the extending direction of the narrow groove 10 on the tread surface 1 connecting to the groove wall 10c that faces the air inflow part 11. The wear prevention portion 12 has a length matching an extending direction length L1 of the narrow groove 10. The length of the wear prevention portion 12 along the extending direction of the narrow groove 10 is not limited and may be set to any length.

The arrangement of the narrow grooves 10 in the drawings is only an example. Apart from the rib-shaped central land portions 7, the narrow grooves 10 may also be provided in the block-shaped central land portions 8 and the block-shaped outer land portions 9. The narrow grooves 10 may be inclined at any angle α (0°<α≤90°) with respect to the tire circumferential direction. Furthermore, a plurality of narrow grooves 10 need not be formed to be parallel to each other. Instead of extending in a straight line, the narrow grooves 10 may include a bent or curved portion. In the example in FIG. 1(a), one end in the extending direction of the narrow groove 10 terminates in the land portion, yet this example is not limiting. Both ends in the extending direction may terminate in the land portion, or both ends may open to another groove. From the perspective of guaranteeing rigidity of the land portion, both ends of the narrow grooves 10 preferably terminate in the land portion.

The position and the shape of the illustrated air inflow part 11 are only an example. As long as the disclosed air inflow part 11 is formed on at least one of the groove walls 10c, of the narrow groove 10, that face each other in the tire circumferential direction, the air inflow part 11 may have any position and any shape with respect to the groove wall 10c of the narrow groove 10. The planar shape of the air inflow part 11 in a development view of the tread surface may be a parallelogram in which one set of opposing sides is parallel to the groove walls 10c of the narrow groove 10 and the other set of opposing sides is parallel to the tire circumferential direction, or a parallelogram in which one set of opposing sides is parallel to the groove walls 10c of the narrow groove 10 and the other set of opposing sides is inclined with respect to the tire circumferential direction. The planar shape of the air inflow part 11 in a development view of the tread surface may also be that of a trapezoid, a semicircle, a triangle, or the like.

The wear prevention portion 12 in FIGS. 1(a) and 1(b) is only an example. It suffices for the groove wall 10c that faces the air inflow part 11 in the narrow groove 10, or the tread surface 1 connecting to this groove wall 10c, to have a protruding or convex shape. The actual shape thereof may be any shape. As illustrated in FIG. 1(b), when the wear prevention portion 12 is a protrusion that projects outward in the tire radial direction, the shape thereof when viewed in a tire circumferential direction cross-section is preferably an arc having a center of curvature inwards in the tire radial direction of the protrusion. With this structure, wear of the protrusion itself can be suppressed, and a reduction in the heat dissipation effect can be suppressed more effectively. The wear prevention portion 12 may be formed not only on one surface, i.e. the groove wall 10c that faces the air inflow part 11 in the narrow groove 10 or the tread surface 1 connecting to this groove wall 10c, but rather on both of these surfaces.

The effects of this embodiment are now described.

When the tire rotates, wind (air) flows around the tire in the opposite direction from the rotation direction of the tire. By taking this wind into the grooves formed on the tread surface 1, heat dissipates at the tread portion, lowering the temperature of the tread portion. Wind can be taken into the grooves by forming wide grooves on the tread surface 1, yet the land portion rigidity reduces, causing wear performance and steering stability to worsen. On the other hand, upon simply forming grooves narrow enough so as not to reduce the land portion rigidity, wind cannot be taken into the grooves. In other words, the majority of the wind is not taken into the narrow groove 10 formed on the tread surface 1. Rather, only a portion of the wind is taken into the narrow groove 10. The wind that is taken into the narrow groove 10, however, does not reach the groove bottom of the narrow groove 10 and ends up flowing out of the narrow groove 10 after passing through a shallow portion of the narrow groove 10. Therefore, the effect of reducing the temperature of the tread portion is small.

To address this issue, the air inflow part 11 is formed on the groove wall 10c at the windward side of the narrow groove 10. That is, the tire is mounted on a vehicle so that the groove wall 10c on which the air inflow part 11 is formed is windward. The majority of the wind can thus be taken into the narrow groove 10, and the wind taken into the narrow groove 10 can be caused to reach a location near the groove bottom. Furthermore, when the air inflow part 11 is additionally or alternatively formed on the groove wall 10c at the downwind side, wind can be caused to flow out from this air inflow part 11. Since one end 10a of the narrow groove 10 terminates in the rib-shaped central land portion 7, the land portion rigidity can be maintained higher than when, for example, both ends open to the central circumferential groove 2. When the air inflow part 11 is not formed on the groove wall 10c at the downwind side, wind can flow out from both ends of the narrow groove 10.

In greater detail, the heat dissipation effect in the tread portion due to the air inflow part 11 is as follows. The wind that flows in from the air inflow part 11 hits the groove wall 10c that faces the groove wall 10c onto which the air inflow part 11 opens, spreads across the bottom and towards both ends in the extending direction of the narrow groove 10, and discharges generated heat from the inner surface of the narrow groove 10 to outside the narrow groove 10. As wear of the tread surface 1 progresses due to use of the tire, the land portion forming the groove wall 10c of the narrow groove wears, causing the surface volume of the groove wall 10c to shrink. As a result, the groove wall 10c cannot sufficiently receive the wind that flows in from the air inflow part 11, and the effect of taking wind into the narrow groove 10 is reduced. To address this issue, the wear prevention portion 12 formed by a protrusion is formed on the tread surface 1 connecting to the groove wall 10c that faces the air inflow part 11 in the narrow groove 10, thereby suppressing wear at this portion and suppressing a reduction in the heat dissipation effect.

In greater detail, wear to the tread surface 1 occurs due to shear deformation produced between when the tread surface 1 contacts the tire ground contact area until the tread surface 1 separates from the tire ground contact area and returns to its original shape. By providing the wear prevention portion 12 formed by a protrusion as above, however, the shear deformation produced in the protrusion can be made smaller than that of the tread surface 1, thereby reducing wear. The reason is that the area of the bottom surface of the projecting protrusion is smaller than the area of the tread surface, and the volume and rigidity of the protrusion are also small. Therefore, at the time of ground contact, the protrusion deforms independently of the tread surface surrounding the protrusion, thereby reducing shear deformation. Wear can also be suppressed and the effect of maintaining the heat dissipation effect can be achieved also when forming a wear prevention portion 12 formed by a protrusion not on the tread surface 1 but rather on the groove wall 10c that faces the air inflow part 11, with the protrusion projecting from the groove wall towards the air inflow part 11. Wear can be suppressed and the heat dissipation effect can be maintained over an extended period of time also when forming a concavity, instead of a protrusion, at a similar position. In the pneumatic tire according to an exemplary embodiment, the wear prevention portion 12 is preferably a protrusion that projects outward in the tire radial direction from the tread surface. According to this structure, a reduction in the heat dissipation effect can more effectively be suppressed, and such a structure can be manufactured easily, thereby achieving high productivity. In the pneumatic tire according to an exemplary embodiment, the wear prevention portion 12 is preferably a protrusion that projects towards the air inflow part 11 from the groove wall that faces the groove wall at which the air inflow part 11 is formed. According to this structure, a reduction in the heat dissipation effect can more effectively be suppressed.

The wear prevention portion 12 preferably extends continuously along only the extending direction of the narrow groove 10, and the length along the extending direction of the narrow groove 10 is preferably 0.05 or more times the length of the air inflow part 11 and is preferably equal to or less than the length of the narrow groove 10. According to this structure, the wear prevention effect can be increased, and the heat dissipation effect can be maintained longer. Furthermore, since the wear prevention portion 12 extends only along the extending direction of the narrow groove 10, the tire can be endowed with an excellent appearance by only providing necessary protrusions in necessary regions.

From the perspective of suppressing wear more reliably and maintaining the heat dissipation effect longer, the tire radial direction height H1 of the wear prevention portion 12 from the tread surface is preferably in a range of 0.005 to 0.08 times the groove depth D1 of the narrow groove 10. For the same reasons, the width W5 is preferably in a range of 0.01 to 0.4 times the groove width W1 of the narrow groove 10.

Even if the air inflow part 11 is sufficiently small with respect to the size of the land portion, the amount of wind in the narrow groove 10 can be greatly increased. Hence, even when forming a sufficient air inflow part 11, the volume of the land portion is not greatly reduced. Therefore, the effect on wear performance and steering stability is small enough to be negligible.

The depth of the air inflow part 11 preferably reaches a maximum at a groove wall opening end 11a that opens to the groove wall 10c of the narrow groove 10. According to this structure, the opening is enlarged, and air flows into the narrow groove 10 more easily. The lateral shape of the air inflow part 11 in a cross-section perpendicular to the extending direction of the narrow groove is preferably such that the depth of the air inflow part 11 gradually increases from the end that is distant from the groove wall opening end 11a where the air inflow part 11 opens to the groove wall 10c of the narrow groove 10 towards the groove wall opening end 11a. According to this structure, the effect of wind inflow can be increased, while suppressing an unnecessary reduction in land portion volume and suppressing degradation of land portion rigidity. The bottom surface of the air inflow part 11 may be either flat or curved. Also, the depth of the air inflow part 11 may increase stepwise towards the groove wall opening end 11a, or the depth of the air inflow part 11 may be constant.

In the case of a directional pattern such that the air inflow part 11 is formed on only one of the groove walls 10c of the narrow groove 10, and all of the air inflow parts 11 are disposed on the same side in the tire circumferential direction, then the pneumatic tire is preferably mounted on a vehicle so that the air inflow parts 11 are disposed at the windward side. From the perspective of convenience, however, the air inflow parts 11 are preferably formed on both of the opposing groove walls 10c of the narrow groove 10, i.e. on the groove walls 10c on both sides. When the air inflow part 11 is only formed on one of the groove walls 10c, it is preferable to adopt a non-directional pattern in which narrow grooves 10 having the air inflow part 11 on the groove wall 10c on the downwind side and narrow grooves 10 having the air inflow part 11 on the groove wall 10c on the windward side are formed. When the air inflow part 11 is formed on the groove walls 10c on both sides of the narrow groove 10, an air flow forms such that air flows into the narrow groove 10 from the air inflow part 11 formed on the groove wall 10c on the windward side, passes through the narrow groove 10, and escapes from the air inflow part 11 formed on the groove wall 10c on the downwind side.

When the air inflow parts 11 are formed on both of the groove walls 10c of the narrow groove 10, then the center, along the extending direction of the narrow groove 10, of the groove wall opening end 11a that opens to the groove wall 10c in the air inflow part 11 formed on one of the groove walls of the narrow groove 10 is preferably separated in the extending direction of the narrow groove 10 from the center, along the extending direction of the narrow groove 10, of the groove wall opening end 11a in the air inflow part 11 formed on the other groove wall 10c of the narrow groove 10, so that the positions of the air inflow parts 11 in the extending direction of the narrow groove 10 do not match. According to this structure, the air flowing in from the air inflow part 11 on the windward side more easily flows through the narrow groove 10 until being discharged from the air inflow part 11 on the downwind side, thereby more reliably improving the heat dissipation effect.

On the groove wall 10c facing the groove wall 10c on which the air inflow part 11 is formed, when a second air inflow part 11 separated from the air inflow part 11 in the extending direction of the narrow groove 10 is formed, as described above, i.e. when respective air inflow parts 11 are formed on the groove walls 10c on both sides of the narrow groove 10, then a wear prevention portion 12 is preferably provided on both groove walls 10c in correspondence with these air inflow parts 11. According to this structure, the heat dissipation effect can be improved while preventing wear of both groove walls 10c, and degradation of the heat dissipation effect can be suppressed, regardless of the direction in which the tire rotates.

The narrow grooves 10 can be formed at any position in the rib-shaped central land portions 7, but from the perspective of land portion rigidity and the heat dissipation effect, the distance W4 in the tire width direction from the intermediate circumferential groove 3 to the narrow groove 10 is preferably in a range of 5% to 40% of the width W3 of the rib-shaped central land portion 7 in the tire width direction. From the perspective of improving the heat dissipation effect with the air inflow part 11, the narrow groove 10 is preferably inclined with respect to the tire circumferential direction at an angle α of 60° to 90°. The reason is that as the narrow groove 10 is closer to being perpendicular to the direction in which air flows (the tire circumferential direction), a stronger wind hits the groove wall 10c of the narrow groove 10, thereby increasing the cooling effect.

As the narrow groove 10 is deeper and narrower, it becomes more difficult to take wind into the narrow groove 10. Therefore, by providing the air inflow part 11 in the narrow groove 10, which has a narrower groove width W1 than the groove depth D1, the effects of this disclosure are remarkably achieved. As the groove width W1 is larger, it becomes easier to take wind into the groove, yet it becomes more difficult to guarantee land portion rigidity.

Furthermore, by providing an air inflow part 11 with a length that spans the entire extending direction of the narrow groove 10, the land portion volume is unnecessarily decreased, and the land portion rigidity may be reduced excessively. A uniform amount of wind also ends up being taken in across the entire extending direction of the narrow groove 10. It is difficult for this wind to flow within the narrow groove 10, and this wind may be prevented from flowing out of the narrow groove 10. When both ends of the narrow groove 10 terminate within the land portion without opening into a groove, this problem becomes pronounced. Therefore, the air inflow part 11 is preferably provided at a portion of the narrow groove 10 in the extending direction thereof. Specifically, the length L2 of the air inflow part 11 (length along the extending direction of the narrow groove 10) is preferably 5 mm or more to ½ or less of the extending direction length L1 of the narrow groove 10.

In an exemplary pneumatic tire, from the perspectives of the cooling effect and of securing land portion rigidity, an air inflow part 11 that opens to the tread surface 1 is preferably formed on at least one of the groove walls 10c, of the narrow groove 10, that face each other in the tire circumferential direction, and the maximum depth D1 of the narrow groove 10 and the maximum depth D2 of the air inflow part 11 preferably satisfy the relationship 1≤D1/D2≤15.

When the narrow groove 10 does not communicate with the tread surface end TE, it is difficult for wind to flow within the narrow groove 10, making this disclosure particularly effective.

This disclosure also achieves a remarkable effect in large tires for trucks, buses, construction vehicles, and the like in which heat generated in the tread portion as a result of the large tire size easily becomes problematic. The effects are particularly achieved in a pneumatic tire having an aspect ratio of 80% or less, a rim diameter of 57 inches or more, an overload ability of 60 mton or more, and a load factor (k-factor) of 1.7 or more. In a pneumatic tire for a construction vehicle, the vehicle-side of the tire (the opposite side from the tire ground contact area in contact with the road) is not covered by the vehicle but rather is exposed, making the effects of this disclosure even more prominent.

In a development view of the tread, suppose that the distance in the tire width direction between both tread surface ends TE is the tread width, a tire width direction region centered on the tire equatorial plane and occupying 50% of the tread width is a central region, and tire width direction regions on either side of the central region are shoulder regions. When the negative ratio of the central region is less than the negative ratio of the shoulder regions, heat generated in the central region tends to reduce the durability of the tire. In such a tire, a strong heat dissipation effect can be achieved and the tire durability can be improved by adopting the narrow grooves and air inflow parts of this disclosure in the central region.

Furthermore, from the perspective of encouraging heat dissipation in the central region, an exemplary pneumatic tire preferably includes a circumferential groove in the central region, in particular positioned on the tire equatorial plane, as in the example in FIG. 1(a). Since it is difficult for wind to flow into the circumferential groove if the groove width of the circumferential groove is 10 mm or less, the heat dissipation effect can be improved by applying this disclosure.

Figure 2A:
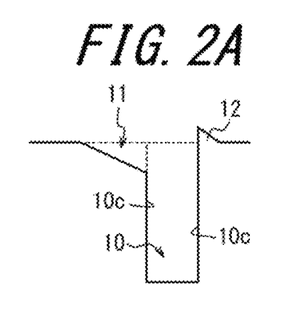
FIGS. 2(a) to 2(j) illustrate modifications to the wear prevention portion.
Figure 2B:
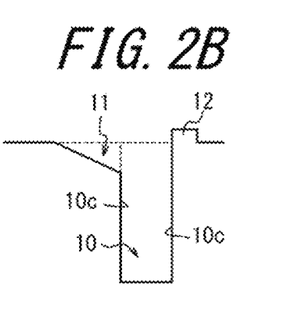
Figure 2C:
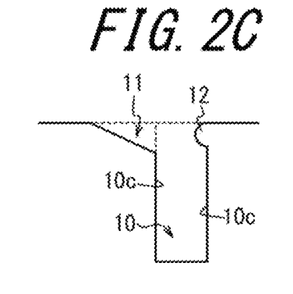
Figure 2D:
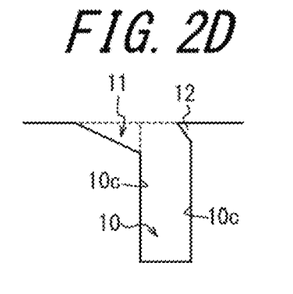
Figure 2E:
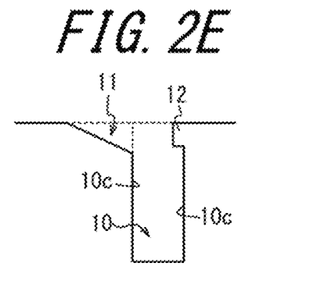
Figure 2F:
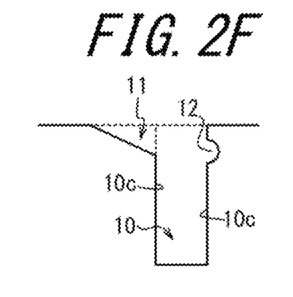
Figure 2G:
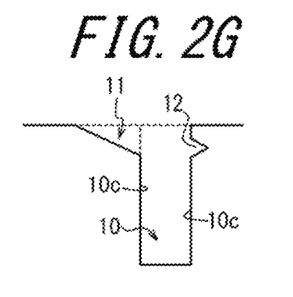
Figure 2H:
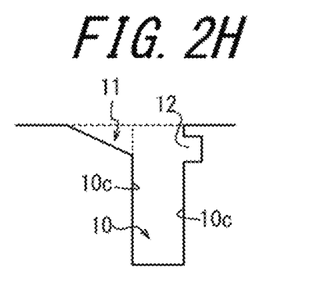
Figure 2I:
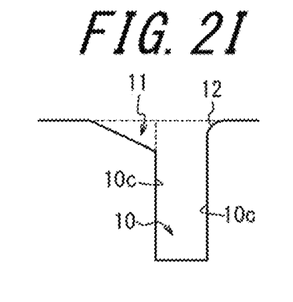
Figure 2J:
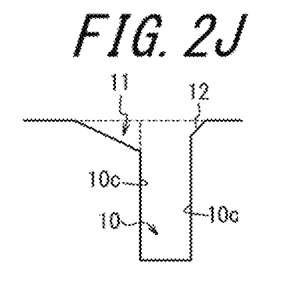

The shape of the wear prevention portion 12 in the A-A cross-section in FIG. 1(a) may be a triangular cross-sectional shape projecting outward in the tire radial direction along the groove wall 10c on the tread surface 1 connecting to the groove wall 10c facing the air inflow part 11, as illustrated in FIG. 2(a), or a rectangular cross-sectional shape projecting outward in the tire radial direction along the groove wall 10c on the tread surface 1 connecting to the groove wall 10c facing the air inflow part 11, as illustrated in FIG. 2(b). The wear prevention portion 12 may also be a generally semicircular cross-sectional shape, a triangular cross-sectional shape, or a rectangular cross-sectional shape projecting towards the air inflow part 11 on the upper edge of the groove wall 10c facing the air inflow part 11, as illustrated in FIGS. 2(c) to 2(e), or may be a concavity with a semicircular cross-sectional shape, a triangular cross-sectional shape, or a rectangular cross-sectional shape formed at a predetermined distance from the tread surface 1 on the upper edge of the groove wall 10c facing the air inflow part 11, as illustrated in FIGS. 2(f) to 2(h). Furthermore, a concavity may be formed on the upper edge of the groove wall 10c facing the air inflow part 11, and the corner sandwiched between the groove wall 10c facing the air inflow part 11 and the tread surface 1 connecting to this groove wall 10c may have a curved shape or be chamfered, as illustrated in FIGS. 2(i) and 2(j). The wear prevention portion 12 may also be formed to have a shape that combines a plurality of the wear prevention portions 12 illustrated in FIGS. 2(a) to 2(j). Like the wear prevention portion 12 in FIG. 1(b), the above wear prevention portions 12 achieve the effects of suppressing wear and maintaining the heat dissipation effect over an extended period of time. When the wear prevention portions 12 illustrated in FIGS. 2(c) to 2(e) are protrusions projecting towards the air inflow part 11 from the groove wall 10c facing the groove wall 10c on which the air inflow part 11 is formed, the wear prevention effect is increased, and the heat dissipation effect can be maintained longer.

Figure 2K:
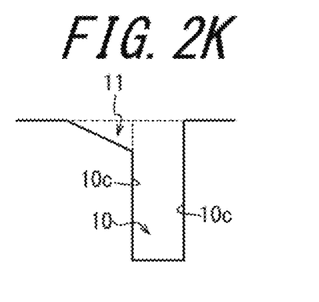
FIG. 2(k) illustrates a comparative example.

As a comparative example, FIG. 2(k) illustrates a cross-section of the groove wall 10c in a narrow groove 10 not provided with the wear prevention portion 12.

Figure 3:
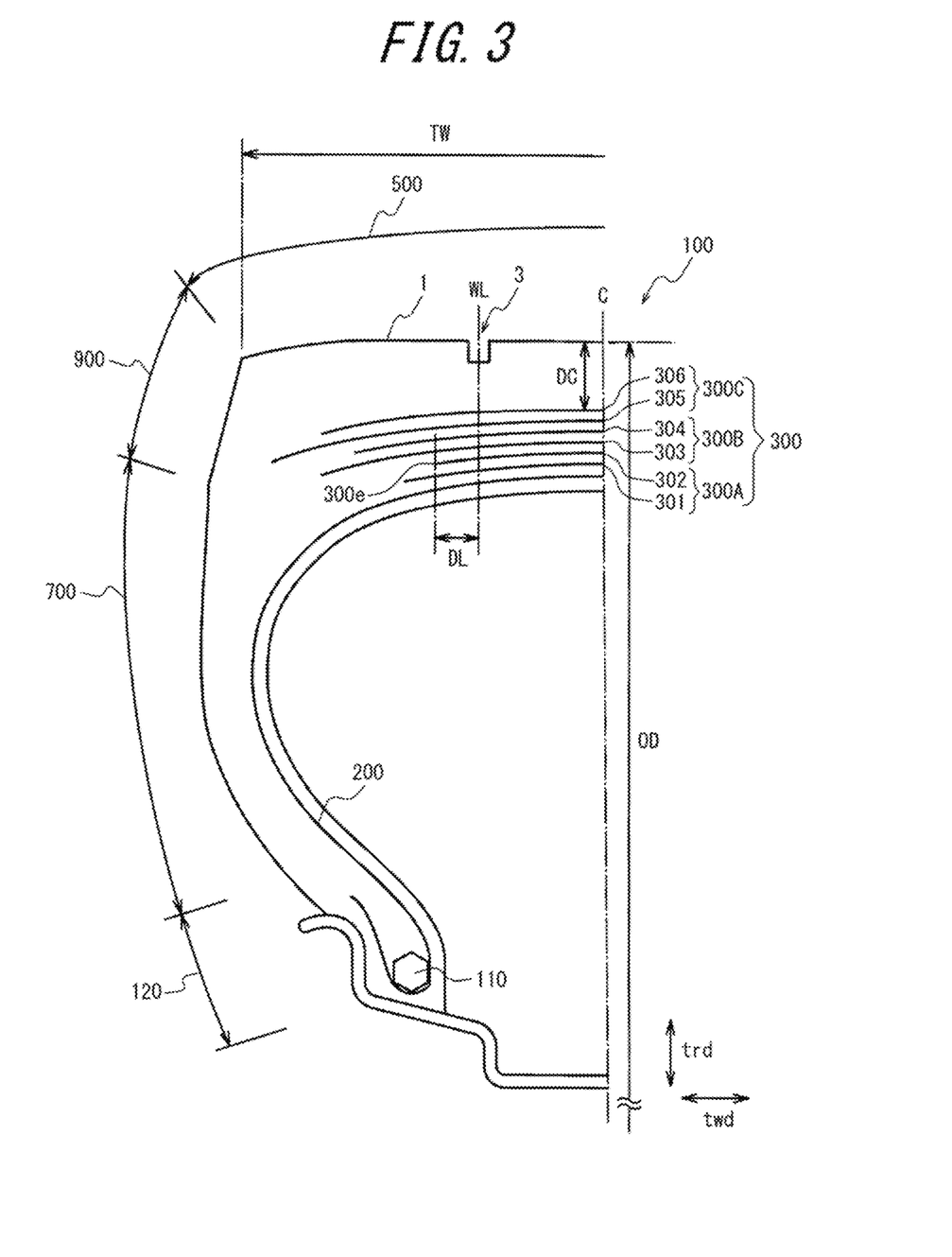
FIG. 3 is a cross-sectional diagram in the tire width direction illustrating the internal structure of a tire according to one of the disclosed embodiments.

FIG. 3 is a cross-sectional diagram in the tire width direction of a pneumatic tire according to one of the disclosed embodiments, in particular illustrating the tire internal structure of a heavy load tire for a construction vehicle or the like. As illustrated in FIG. 3, the rubber gauge (rubber thickness) of a tread portion 500 in this tire 100 is thick as compared to a pneumatic tire mounted on a passenger vehicle or the like. The tire internal structure described below may be adopted in any tire having the tread pattern described with reference to FIGS. 1(a) and 1(b).

Specifically, the relationship DC/OD≥0.015 is satisfied in the tire 100, where OD is the tire outer diameter, and DC is the rubber gauge of the tread portion 500 at a position on the tire equatorial plane C.

The tire outer diameter OD (units: mm) refers to the diameter of the tire 100 in a portion with the maximum outer diameter of the tire 100 (generally, the tread portion 500 near the tire equatorial plane C). The rubber gauge DC (units: mm) refers to the rubber thickness of the tread portion 500 at the position of the tire equatorial plane C. The thickness of the belt 300 is not included in the rubber gauge DC. When a circumferential groove is formed at a position that includes the tire equatorial plane C, the rubber gauge DC is taken as the rubber thickness of the tread portion 500 at a position adjacent to the circumferential groove.

As illustrated in FIG. 3, the tire 100 is provided with a pair of bead cores 110, a carcass 200, and a belt 300 formed by a plurality of belt layers. While only half of the tire 100 in the width direction is illustrated in FIG. 3, the other non-illustrated half of the tire 100 has the same structure.

The bead core 110 is provided in a bead portion 120. The bead core 110 is configured by bead wires (not illustrated).

The carcass 200 forms the skeleton of the tire 100. The carcass 200 is positioned to extend from the tread portion 500 across a buttress 900 and a sidewall 700 to the bead portion 120.

The carcass 200 has a toroidal shape spanning the pair of bead cores 110. In this embodiment, the carcass 200 wraps around the bead cores 110. The carcass 200 is in contact with the bead cores 110. The edges of the carcass 200 in the tire width direction twd are supported by the pair of bead portions 120.

The carcass 200 includes a carcass cord that, in plan view from the tread surface 1, extends in a predetermined direction. In this embodiment, the carcass cord extends along the tire width direction twd. Steel wire, for example, is used as the carcass cord.

The belt 300 is provided in the tread portion 500. The belt 300 is positioned on the outside of the carcass 200 in the tire radial direction trd. The belt 300 extends in the tire circumferential direction. The belt 300 includes belt cords that extend at an inclination with respect to the predetermined direction in which the carcass cord extends. Steel cords, for example, are used as the belt cords.

The belt 300 formed by a plurality of belt layers includes a first belt layer 301, a second belt layer 302, a third belt layer 303, a fourth belt layer 304, a fifth belt layer 305, and a sixth belt layer 306.

The first belt layer 301 is positioned on the outside of the carcass 200 in the tire radial direction trd. The first belt layer 301 is positioned furthest inward in the tire radial direction trd within the belt 300 formed by the plurality of belt layers. The second belt layer 302 is positioned on the outside of the first belt layer 301 in the tire radial direction trd. The third belt layer 303 is positioned on the outside of the second belt layer 302 in the tire radial direction trd. The fourth belt layer 304 is positioned on the outside of the third belt layer 303 in the tire radial direction trd. The fifth belt layer 305 is positioned on the outside of the fourth belt layer 304 in the tire radial direction trd. The sixth belt layer 306 is positioned on the outside of the fifth belt layer 305 in the tire radial direction trd. The sixth belt layer 306 is positioned furthest outward in the tire radial direction trd within the belt 300 formed by the plurality of belt layers. From the inside to the outside in the tire radial direction trd, the belt layers are disposed in the order of the first belt layer 301, second belt layer 302, third belt layer 303, fourth belt layer 304, fifth belt layer 305, and sixth belt layer 306.

In this embodiment, in the tire width direction twd, the width of the first belt layer 301 and the second belt layer 302 (width measured along the tire width direction twd; same holds below) is 25% or more to 70% or less of the tread width TW. In the tire width direction twd, the width of the third belt layer 303 and the fourth belt layer 304 is 55% or more to 90% or less of the tread width TW. In the tire width direction twd, the width of the fifth belt layer 305 and the sixth belt layer 306 is 60% or more to 110% or less of the tread width TW.

In this embodiment, in the tire width direction twd, the width of the fifth belt layer 305 is greater than the width of the third belt layer 303, the width of the third belt layer 303 is equal to or greater than the width of the sixth belt layer 306, the width of the sixth belt layer 306 is greater than the width of the fourth belt layer 304, the width of the fourth belt layer 304 is greater than the width of the first belt layer 301, and the width of the first belt layer 301 is greater than the width of the second belt layer 302. In the tire width direction twd, within the belt 300 formed by the plurality of belt layers, the width of the fifth belt layer 305 is the greatest, and the width of the second belt layer 302 is the smallest. Accordingly, the belt 300 formed by the plurality of belt layers includes a shortest belt layer with the shortest length in the tire width direction twd (i.e. the second belt layer 302).

The second belt layer 302 that is the shortest belt layer has a belt end 300e that is an edge of the second belt layer 302 in the tire width direction twd.

In this embodiment, in plan view from the tread surface 1, the inclination angle of the belt cords of the first belt layer 301 and the second belt layer 302 with respect to the carcass cord is 70° or more to 85° or less. The inclination angle of the belt cords of the third belt layer 303 and the fourth belt layer 304 with respect to the carcass cord is 50° or more to 75° or less. The inclination angle of the belt cords of the fifth belt layer 305 and the sixth belt layer 306 with respect to the carcass cord is 50° or more to 70° or less.

The belt 300 formed by the plurality of belt layers includes an inner intersecting belt group 300A, an intermediate intersecting belt group 300B, and an outer intersecting belt group 300C. The intersecting belt groups 300A to 300C each refer to a group of a plurality of belt layers in which, in plan view from the tread surface 1, the belt cords composing the belt layers within the group intersect between belt layers that are adjacent within the group (preferably with the tire equatorial plane therebetween).

The inner intersecting belt group 300A is formed by a pair of belt layers and is positioned on the outside of the carcass 200 in the tire radial direction trd. The inner intersecting belt group 300A is formed by the first belt layer 301 and the second belt layer 302. The intermediate intersecting belt group 300B is formed by a pair of belt layers and is positioned on the outside of the inner intersecting belt group 300A in the tire radial direction trd. The intermediate intersecting belt group 300B is formed by the third belt layer 303 and the fourth belt layer 304. The outer intersecting belt group 300C is formed by a pair of belt layers and is positioned on the outside of the intermediate intersecting belt group 300B in the tire radial direction trd. The outer intersecting belt group 300C is formed by the fifth belt layer 305 and the sixth belt layer 306.

In the tire width direction twd, the width of the inner intersecting belt group 300A is 25% or more to 70% or less of the tread width TW. In the tire width direction twd, the width of the intermediate intersecting belt group 300B is 55% or more to 90% or less of the tread width TW. In the tire width direction twd, the width of the outer intersecting belt group 300C is 60% or more to 110% or less of the tread width TW.

In plan view from the tread surface 1, the inclination angle of the belt cords of the inner intersecting belt group 300A with respect to the carcass cord is 70° or more to 85° or less. In plan view from the tread surface 1, the inclination angle of the belt cords of the intermediate intersecting belt group 300B with respect to the carcass cord is 50° or more to 75° or less. In plan view from the tread surface 1, the inclination angle of the belt cords of the outer intersecting belt group 300C with respect to the carcass cord is 50° or more to 70° or less.

In plan view from the tread surface 1, the inclination angle of the belt cords with respect to the carcass cord is the greatest for the inner intersecting belt group 300A. The inclination angle of the belt cords of the intermediate intersecting belt group 300B with respect to the carcass cord is equal to or greater than the inclination angle of the belt cords of the outer intersecting belt group 300C with respect to the carcass cord.

The circumferential groove (intermediate circumferential groove) 3 is formed so that the length DL along the tire width direction twd is 200 mm or less. The length DL is the length from the belt end 300e to the innermost position in the tire width direction of a groove width center line WL that traverses the center in the width direction of the circumferential groove 3 in plan view from the tread surface 1 of the tire 100 (i.e. the location of loopback inwards in the tire width direction).

The following describes the effects of the air inflow part 11 in detail.

Figure 4A:
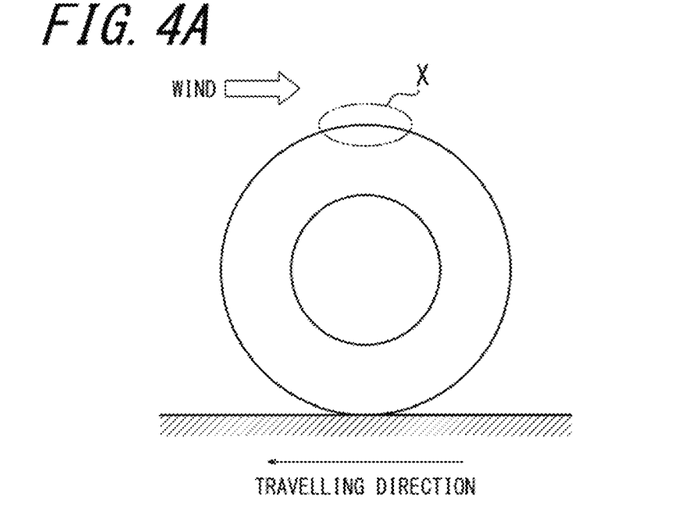
FIGS. 4(a) to 4(c) illustrate the effect of an exemplary embodiment.
Figure 4B:
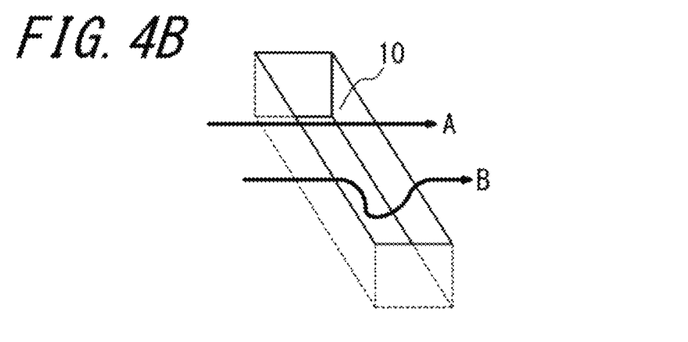

As illustrated in FIG. 4(a), when the tire rotates, wind flows around the tire in the opposite direction from the travelling direction. By taking this wind into the grooves formed on the tread surface 1, heat dissipates at the tread portion, lowering the temperature of the tread portion. Wind can be taken into the grooves by forming wide grooves on the tread surface 1, yet the land portion rigidity reduces, causing wear performance and steering stability to worsen. On the other hand, upon forming grooves narrow enough so as not to reduce the land portion rigidity, wind cannot be taken into the grooves. In other words, the majority of the wind is not taken into the narrow groove 10 formed on the tread surface 1, as indicated by arrow A in FIG. 4(b), which illustrates the portion indicated by the X in FIG. 4(a). Rather, only a portion of the wind is taken into the narrow groove 10, as indicated by arrow B. The wind indicated by arrow B, however, does not reach the groove bottom of the narrow groove 10 and ends up flowing out of the narrow groove 10 after passing through a shallow portion of the narrow groove 10. Therefore, the effect of reducing the temperature of the tread portion is small.

Figure 4C:
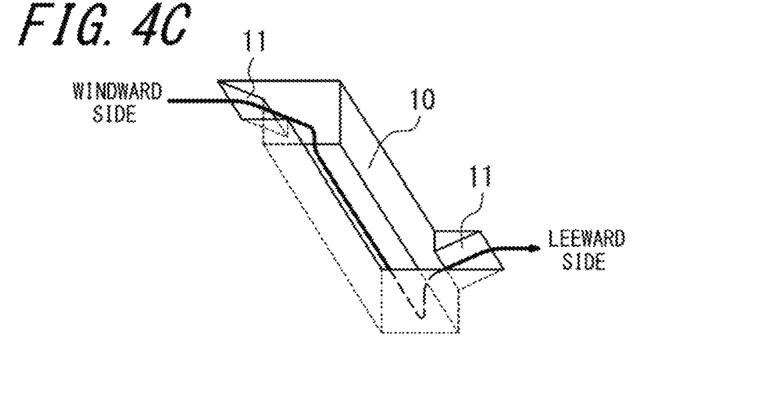

To address this issue, as illustrated in FIG. 4(c), the air inflow part 11 is formed in the groove wall on the windward side of the narrow groove 10. The majority of the wind is thus taken into the narrow groove 10, and the wind taken into the narrow groove 10 reaches the groove bottom. When an air inflow part 11 is also formed in the groove wall on the downwind side, the air can then flow out from this air inflow part 11. Even when an air inflow part 11 is not formed in the groove wall on the downwind side, the wind that has nowhere to go at the end of the narrow groove 10 flows out from the end of the groove wall at the downwind side. Hence, the effect of reducing the temperature in the tread portion can be increased.

In particular, in a pneumatic tire for a construction vehicle, the vehicle-side of the tire indicated by the letter X in FIG. 4(a) (the opposite side from the tread surface) is not covered by the vehicle but rather is exposed, making the effects of this disclosure even more prominent.

Figure 5A:
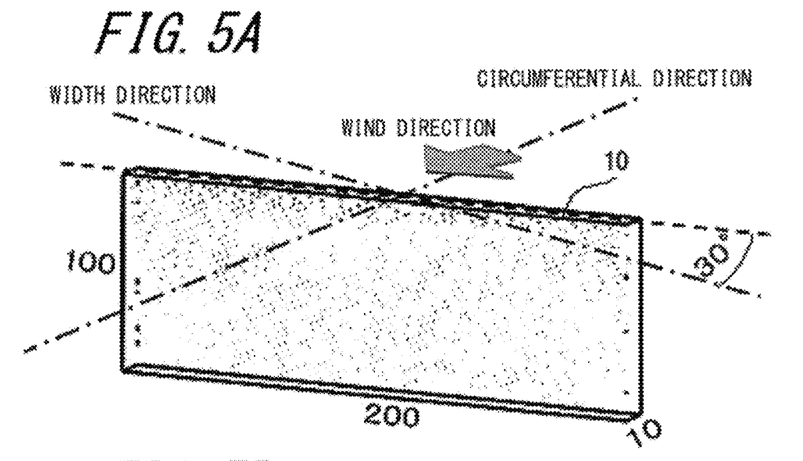
FIGS. 5(a) to 5(c) illustrate a wind speed vector within a narrow groove.
Figure 5B:
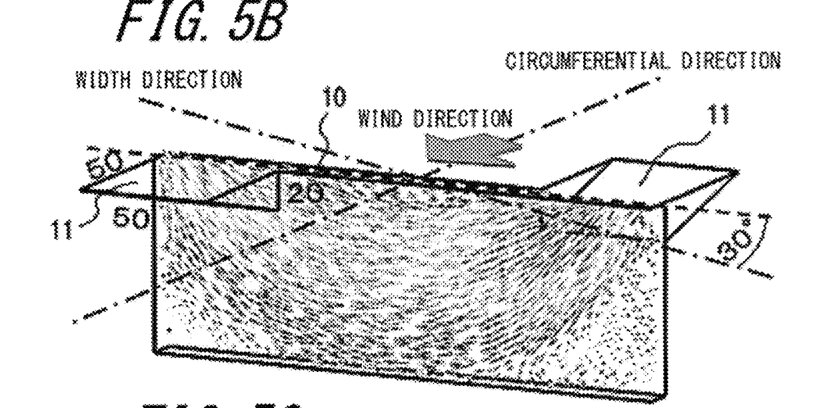
Figure 5C:
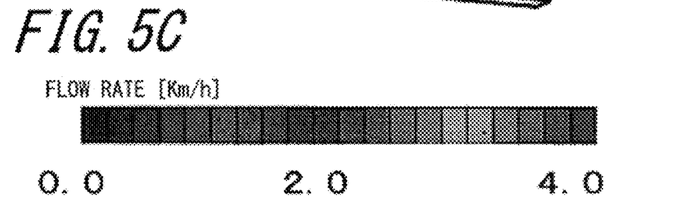

With reference to FIGS. 5(a) to 5(c), a numerical analysis of the wind speed vector inside the narrow groove 10 is described.

For a narrow groove 10 inclined at 30° with respect to the tire width direction, FIG. 5(a) illustrates the case of not providing an air inflow part 11, and FIG. 5(b) illustrates the case of providing air inflow parts 11 on both the windward side and the leeward side. FIG. 5(c) illustrates the flow rate. The narrow groove 10 measures 200 mm in the longitudinal direction, 10 mm wide, and 100 mm deep and is inclined 30° with respect to the tire width direction. The air inflow part 11 measures 50 mm long (length along the longitudinal direction of the narrow groove 10), 50 mm wide, and 20 mm thick at the deepest portion.

As illustrated in FIG. 5(a), when not providing an air inflow part 11, it is clear that almost no air is taken into the narrow groove 10.

Conversely, as illustrated in FIG. 5(b), when providing the air inflow parts 11, the wind speed vector reaches a maximum near the air inflow part 11 on the groove wall at the windward side, and wind is taken into the narrow groove 10. It is also clear that near the air inflow part 11 on the groove wall at the leeward side, the wind speed vector increases.

When forming the air inflow part 11 on only one of the groove walls of the narrow groove 10, the pneumatic tire should be mounted on the vehicle so that the air inflow part 11 is formed on the groove wall at the windward side of the narrow groove 10.

When forming the air inflow part 11 on only one of the groove walls of the narrow groove 10, however, the pattern becomes directional, making the pneumatic tire less convenient. A non-directional pattern is therefore preferably adopted by forming the air inflow parts 11 on the groove walls on both sides of the narrow groove 10, as in the illustrated example described above.

Whereas the air inflow part 11 formed on the groove wall at the windward side functions to allow inflow of air (to take in air), the air inflow part 11 formed on the groove wall at the leeward side does not function to allow inflow of air. Therefore, an airflow is formed such that air flows into the narrow groove 10 from the air inflow part 11 formed on the groove wall at the windward side, passes through the narrow groove 10, and escapes from the air inflow part 11 formed on the groove wall on the leeward side.

The reason for setting the groove width of the narrow groove 10 to be less than the groove depth is because if the narrow groove 10 is shallow and wide, wind is easily taken into the narrow groove 10 even without forming the air inflow part 11, in which case the effects of this disclosure are reduced. Furthermore, if the narrow groove 10 is shallow, it is difficult for the effect of reducing temperature to reach the inside of the tread portion even when the heat transfer coefficient of the narrow groove 10 wall surface is raised.

Even if the air inflow part 11 is sufficiently small with respect to the size of the land portion, the amount of wind in the narrow groove 10 can be increased. Hence, even when forming the air inflow part 11, the volume of the land portion is not greatly reduced. Therefore, the effect on wear performance and steering stability is small enough to be negligible.

Furthermore, by providing an air inflow part 11 with a length that spans the entire longitudinal direction of the narrow groove 10, a uniform amount of wind ends up being taken in across the entire longitudinal direction of the narrow groove 10. This wind cannot flow within the narrow groove 10 and is prevented from flowing out of the narrow groove 10. In particular, when the narrow groove 10 is isolated (when both ends of the narrow groove 10 terminate within the land portion without opening into a groove), this problem becomes pronounced. Therefore, the air inflow part 11 is preferably provided at a portion of the narrow groove 10 in the longitudinal direction thereof.

Specifically, the length of the air inflow part 11 (length along the longitudinal direction of the narrow groove 10) is preferably 5 mm or more to ½ or less of the extending direction length of the narrow groove 10.

The "longitudinal direction of the narrow groove" refers to the direction of a straight line that connects the intermediate points, on the groove bottom, that lie between opposing groove walls at each end (or open end, when the narrow groove has an open end) of the narrow groove.

The air inflow part 11 becomes smaller as the tread portion wears, and the effect of taking in wind, i.e. the heat dissipation performance, decreases. However, since the amount of heat generated in the tread portion also decreases as the tread portion wears, there is little need for designing the air inflow part 11 in a new pneumatic tire to be particularly large in anticipation of wear.

The narrow groove 10 preferably closes upon ground contact. Specifically, the width of the narrow groove 10 is preferably about 10 mm to 20 mm. When the narrow groove 10 closes upon ground contact, the rib-shaped central land portion 6 becomes one continuous land portion. The rigidity of the land portion thus increases, and the wear performance can be improved.

With reference to FIG. 6(a) through FIG. 9(i), the following describes various modifications to the air inflow part 11. The arrows in the figures represent the wind direction.

Figure 6A:
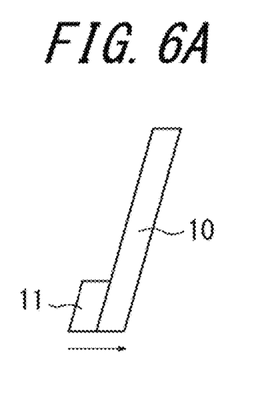
FIGS. 6(a) to 6(c) illustrate modifications to the inflow part.
Figure 6B:
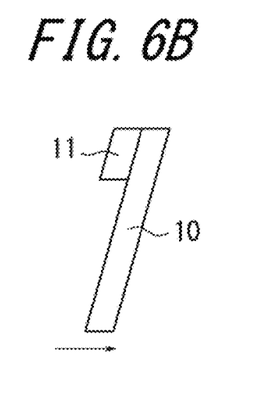
Figure 6C:
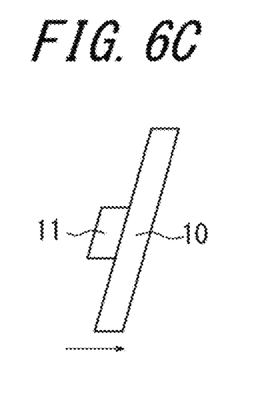

When the narrow groove 10 extends in a direction inclined with respect to the tire width direction, then between the two ends of the narrow groove 10, the air inflow part 11 may be formed on the groove wall at the end that is hit by the wind first, as illustrated in FIG. 6(a), or formed on the groove wall at the end that is hit by the wind last, as illustrated in FIG. 6(b). The air inflow part 11 may also be formed in the central portion of the narrow groove 10, as illustrated in FIG. 6(c).

When the air inflow part 11 is formed on both of the groove walls at the windward side and the leeward side of the narrow groove 10, then the center A, along the longitudinal direction of the narrow groove 10, of the air inflow part 11 formed on one of the groove walls of the narrow groove 10 is preferably separated in the longitudinal direction of the narrow groove 10 from the center B, along the longitudinal direction of the narrow groove 10, of the air inflow part 11 formed on the other groove wall of the narrow groove 10, so that the air inflow parts do not overlap in the tire circumferential direction (the direction from which the wind flows).

Figures 7A, 7B, 7D:
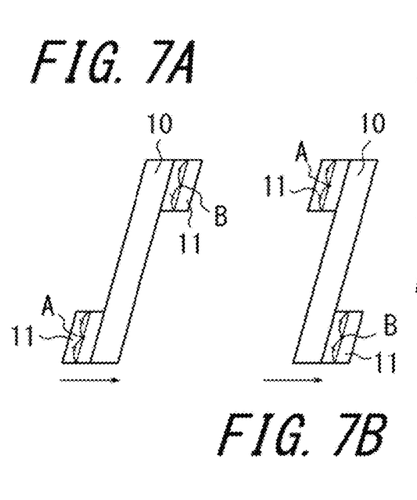
FIGS. 7(a) to 7(e) illustrate modifications to the inflow part.
Figure 7C:
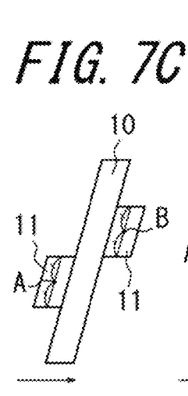
Figure 7E:
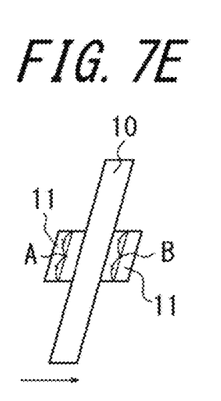

Specifically, the air inflow parts 11 are preferably formed at each end of the narrow groove 10, as illustrated in FIGS. 7(a) and 7(b), or formed to be staggered in the central portion of the narrow groove 10, as illustrated in FIGS. 7(c) and 7(d). The air inflow parts 11 may, however, be aligned in the central portion of the narrow groove 10, i.e. formed without an interval in the longitudinal direction of the narrow groove 10 between point A and point B, as illustrated in FIG. 7(e).

Figure 8A:
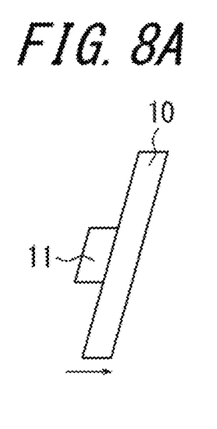
FIGS. 8(a) to 8(h) illustrate modifications to the inflow part.
Figure 8B:
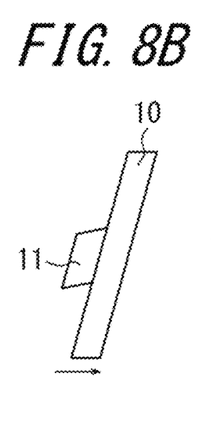
Figure 8C:
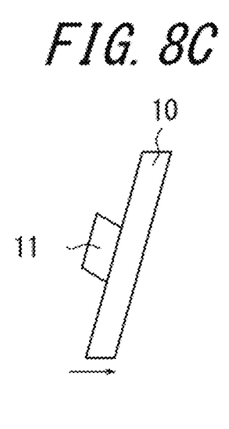
Figure 8D:
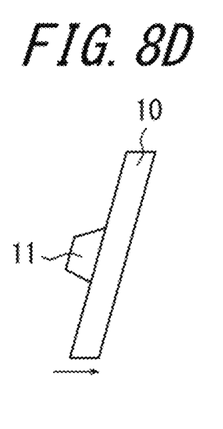
Figure 8E:
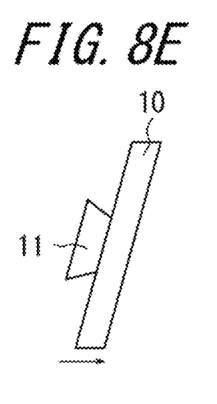
Figure 8F:
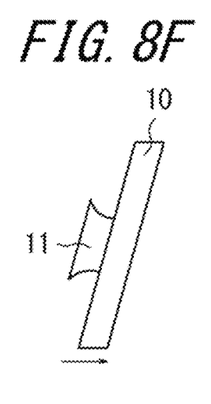
Figure 8G:
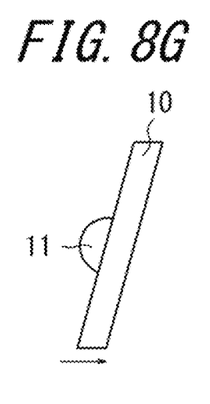
Figure 8H:
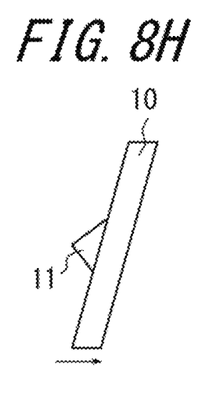

The planar shape of the air inflow part 11 when viewed from the tread surface may be a parallelogram in which one set of opposing sides is parallel to the groove walls of the narrow groove 10 and the other set of opposing sides is parallel to the tire circumferential direction, as illustrated in FIG. 8(a), or a parallelogram in which one set of opposing sides is parallel to the groove walls of the narrow groove 10 and the other set of opposing sides is inclined with respect to the tire circumferential direction, as illustrated in FIGS. 8(b) and 8(c). The air inflow part 11 may also be a trapezoid in which the bottom opens to the wall of the narrow groove 10 and the top is positioned farther from the wall of the narrow groove 10, as illustrated in FIG. 8(d), i.e. so that the length in the tire width direction gradually decreases from the wall of the narrow groove 10. The air inflow part 11 may also be a trapezoid in which the top opens to the wall of the narrow groove 10 and the bottom is positioned farther from the wall of the narrow groove 10, as illustrated in FIG. 8(e), i.e. so that the length in the tire width direction gradually increases from the wall of the narrow groove 10. The air inflow part 11 may also be like the trapezoid illustrated in FIG. 8(e), but with the two sides other than the top and bottom being curves, as illustrated in FIG. 8(f). The air inflow part 11 may also be a semicircle, as illustrated in FIG. 8(g), or a triangle, as illustrated in FIG. 8(h).

Figure 9A:
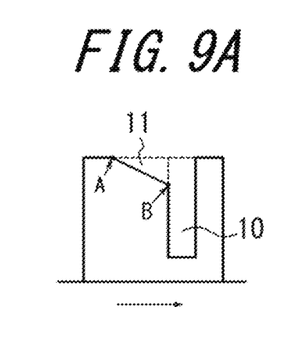
FIGS. 9(a) to 9(i) illustrate modifications to the inflow part.
Figure 9B:
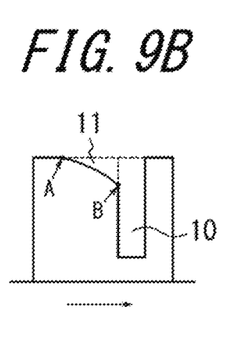
Figure 9C:
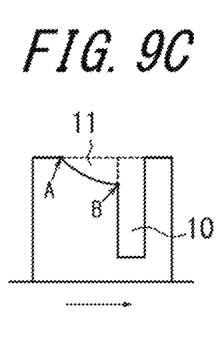
Figure 9D:
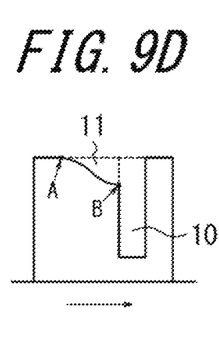
Figure 9E:
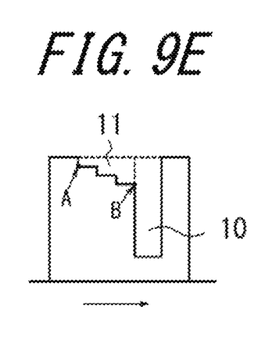
Figure 9F:
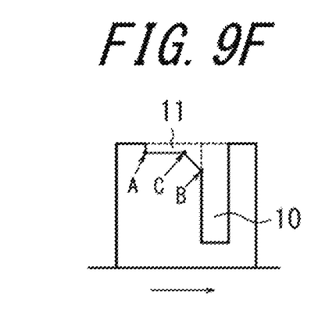
Figure 9G:
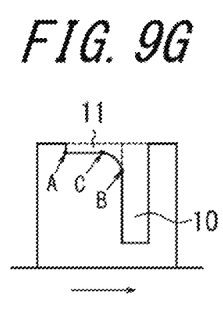
Figure 9H:
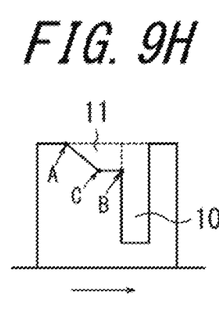
Figure 9I:
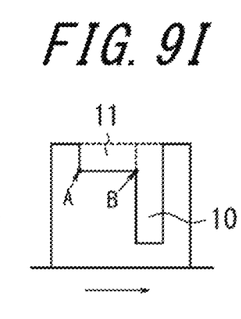

As illustrated in FIGS. 9(a) to 9(d), the lateral shape of the air inflow part 11 in a cross-section perpendicular to the longitudinal direction of the narrow groove is preferably such that the depth of the air inflow part 11 gradually increases from the side that is farther from the wall of the narrow groove 10 (point A in FIGS. 9(a) to 9(d)) towards the side that opens to the wall of the narrow groove 10 (point B in FIGS. 9(a) to 9(d)), with the depth of the air inflow part 11 reaching a maximum at the side that opens to the wall of the narrow groove 10. The bottom surface of the air inflow part 11 may be flat, as illustrated in FIG. 9(a), or curved, as illustrated in FIGS. 9(b) to 9(d). The depth of the air inflow part 11 may also increase stepwise from point A to point B, as illustrated in FIG. 9(e). The depth of the air inflow part 11 may also be constant from point A to point C and increase gradually from point C to point B, as illustrated in FIGS. 9(f) and 9(g), or the depth of the air inflow part 11 may increase gradually from point A to point C and be constant from point C to point B, as illustrated in FIG. 9(h). The depth of the air inflow part 11 may also be constant from point A to point B, as illustrated in FIG. 9(i).

EXAMPLES

The following describes exemplary pneumatic tires. A construction vehicle tire with a tire size of 59/80R63 was used in both the Examples and the Comparative Examples. Table 1 lists the corresponding figure and the dimensions of each tire in the Examples and Comparative Examples. L3 (mm) indicates the length of the wear prevention portion 12 along the extending direction of the narrow groove 10, and θ indicates the angle of the extending direction of the air inflow part with respect to the extending direction of the narrow groove 10. Using the above tires, the temperature on the belt was monitored with an indoor drum test, and the duration of the heat dissipation effect was evaluated. The load condition was a regular load, and the speed condition was 8 km/h. Table 1 lists the measurement results. The results are expressed as an index using Comparative Example 1 as a standard. As the value of this index is larger, the heat dissipation effect is higher. The dimensions were measured along the tire surface of a pneumatic tire that was mounted on a regular rim with regular internal pressure and no load applied ("predetermined conditions"). The "regular rim" refers to the "standard rim" specified by JATMA, the "Design Rim" specified by TRA, or the "Measuring Rim" specified by ETRTO. The "regular internal pressure" refers to the "maximum air pressure" specified by JATMA, the maximum value of the "TIRE LOAD LIMITS AT VARIOUS COLD INFLATION PRESSURES" specified by TRA, or the "INFLATION PRESSURES" specified by ETRTO.

|  | Comparative Example 1 | Example 1 | Example 2 | Example 3 | Example 4 | Example 5 | Example 6 | Example 7 | Example 8 | Example 9 | Example 10 | Comparative Example 2 |
|---|---|---|---|---|---|---|---|---|---|---|---|---|
| Corresp. FIG. | FIG. 1(b) | FIG. 2(a) | FIG. 2(b) | FIG. 2(c) | FIG. 2(d) | FIG. 2(e) | FIG. 2(f) | FIG. 2(g) | FIG. 2(h) | FIG. 2(i) | FIG. 2(j) | FIG. 2(k) |

Table 1-1

|  | | | | | | | | | | | | |
|---|---|---|---|---|---|---|---|---|---|---|---|---|
| D1 | 100 | 100 | 100 | 100 | 100 | 100 | 100 | 100 | 100 | 100 | 100 | 100 |
| W1 | 10 | 10 | 10 | 10 | 10 | 10 | 10 | 10 | 10 | 10 | 10 | 10 |
| L1 | 70 | 70 | 70 | 70 | 70 | 70 | 70 | 70 | 70 | 70 | 70 | 70 |
| α | 60 | 60 | 60 | 60 | 60 | 60 | 60 | 60 | 60 | 60 | 60 | 60 |
| D2 | — | 20 | 20 | 20 | 20 | 20 | 20 | 20 | 20 | 20 | 20 | 20 |
| W2 | — | 50 | 50 | 50 | 50 | 50 | 50 | 50 | 50 | 50 | 50 | 50 |
| L2 | — | 30 | 30 | 30 | 30 | 30 | 30 | 30 | 30 | 30 | 30 | 30 |
| θ | — | 60 | 60 | 60 | 60 | 60 | 60 | 60 | 60 | 60 | 60 | 60 |
| L3 | — | 0.9 | 0.9 | 0.9 | 0.9 | 0.9 | 0.9 | 0.9 | 0.9 | 0.9 | 0.9 | — |
| Heat dissipation effect | 100 | 110 | 109 | 110 | 110 | 109 | 109 | 110 | 110 | 109 | 110 | 110 |

Table 1-2

|  | | | | | | | | | | | | |
|---|---|---|---|---|---|---|---|---|---|---|---|---|
| D1 | 100 | 100 | 100 | 100 | 100 | 100 | 100 | 100 | 100 | 100 | 100 | 100 |
| W1 | 10 | 10 | 10 | 10 | 10 | 10 | 10 | 10 | 10 | 10 | 10 | 10 |
| L1 | 70 | 70 | 70 | 70 | 70 | 70 | 70 | 70 | 70 | 70 | 70 | 70 |
| α | 60 | 60 | 60 | 60 | 60 | 60 | 60 | 60 | 60 | 60 | 60 | 60 |
| D2 | — | 20 | 20 | 20 | 20 | 20 | 20 | 20 | 20 | 20 | 20 | 20 |
| W2 | — | 50 | 50 | 50 | 50 | 50 | 50 | 50 | 50 | 50 | 50 | 50 |
| L2 | — | 30 | 30 | 30 | 30 | 30 | 30 | 30 | 30 | 30 | 30 | 30 |
| θ | — | 60 | 60 | 60 | 60 | 60 | 60 | 60 | 60 | 60 | 60 | 60 |
| L3 | — | 1.5 | 1.5 | 1.5 | 1.5 | 1.5 | 1.5 | 1.5 | 1.5 | 1.5 | 1.5 | — |
| Heat dissipation effect | 100 | 113 | 112 | 112 | 111 | 111 | 112 | 112 | 111 | 111 | 111 | 110 |

Table 1-3

|  | | | | | | | | | | | | |
|---|---|---|---|---|---|---|---|---|---|---|---|---|
| D1 | 100 | 100 | 100 | 100 | 100 | 100 | 100 | 100 | 100 | 100 | 100 | 100 |
| W1 | 10 | 10 | 10 | 10 | 10 | 10 | 10 | 10 | 10 | 10 | 10 | 10 |
| L1 | 70 | 70 | 70 | 70 | 70 | 70 | 70 | 70 | 70 | 70 | 70 | 70 |
| α | 60 | 60 | 60 | 60 | 60 | 60 | 60 | 60 | 60 | 60 | 60 | 60 |
| D2 | — | 20 | 20 | 20 | 20 | 20 | 20 | 20 | 20 | 20 | 20 | 20 |
| W2 | — | 50 | 50 | 50 | 50 | 50 | 50 | 50 | 50 | 50 | 50 | 50 |
| L2 | — | 30 | 30 | 30 | 30 | 30 | 30 | 30 | 30 | 30 | 30 | 30 |
| θ | — | 60 | 60 | 60 | 60 | 60 | 60 | 60 | 60 | 60 | 60 | 60 |
| L3 | — | 30 | 30 | 30 | 30 | 30 | 30 | 30 | 30 | 30 | 30 | — |
| Heat dissipation effect | 100 | 114 | 115 | 113 | 114 | 112 | 114 | 113 | 113 | 112 | 112 | 110 |

Table 1-4

|  | | | | | | | | | | | | |
|---|---|---|---|---|---|---|---|---|---|---|---|---|
| D1 | 100 | 100 | 100 | 100 | 100 | 100 | 100 | 100 | 100 | 100 | 100 | 100 |
| W1 | 10 | 10 | 10 | 10 | 10 | 10 | 10 | 10 | 10 | 10 | 10 | 10 |
| L1 | 70 | 70 | 70 | 70 | 70 | 70 | 70 | 70 | 70 | 70 | 70 | 70 |
| α | 60 | 60 | 60 | 60 | 60 | 60 | 60 | 60 | 60 | 60 | 60 | 60 |
| D2 | — | 20 | 20 | 20 | 20 | 20 | 20 | 20 | 20 | 20 | 20 | 20 |
| W2 | — | 50 | 50 | 50 | 50 | 50 | 50 | 50 | 50 | 50 | 50 | 50 |
| L2 | — | 30 | 30 | 30 | 30 | 30 | 30 | 30 | 30 | 30 | 30 | 30 |
| θ | — | 60 | 60 | 60 | 60 | 60 | 60 | 60 | 60 | 60 | 60 | 60 |
| L3 | — | 60 | 60 | 60 | 60 | 60 | 60 | 60 | 60 | 60 | 60 | — |
| Heat dissipation effect | 100 | 115 | 114 | 114 | 115 | 113 | 113 | 113 | 114 | 111 | 111 | 110 |

Table 1-5

|  | | | | | | | | | | | | |
|---|---|---|---|---|---|---|---|---|---|---|---|---|
| D1 | 100 | 100 | 100 | 100 | 100 | 100 | 100 | 100 | 100 | 100 | 100 | 100 |
| W1 | 10 | 10 | 10 | 10 | 10 | 10 | 10 | 10 | 10 | 10 | 10 | 10 |
| L1 | 70 | 70 | 70 | 70 | 70 | 70 | 70 | 70 | 70 | 70 | 70 | 70 |
| α | 60 | 60 | 60 | 60 | 60 | 60 | 60 | 60 | 60 | 60 | 60 | 60 |

-continued

| | Comparative Example 1 | Example 1 | Example 2 | Example 3 | Example 4 | Example 5 | Example 6 | Example 7 | Example 8 | Example 9 | Example 10 | Comparative Example 2 |
|---|---|---|---|---|---|---|---|---|---|---|---|---|
| | | | | | | | Corresp. FIG. | | | | | |
| | FIG. 1(b) | FIG. 2(a) | FIG. 2(b) | FIG. 2(c) | FIG. 2(d) | FIG. 2(e) | FIG. 2(f) | FIG. 2(g) | FIG. 2(h) | FIG. 2(i) | FIG. 2(j) | FIG. 2(k) |
| D2 | — | 20 | 20 | 20 | 20 | 20 | 20 | 20 | 20 | 20 | 20 | 20 |
| W2 | — | 50 | 50 | 50 | 50 | 50 | 50 | 50 | 50 | 50 | 50 | 50 |
| L2 | — | 30 | 30 | 30 | 30 | 30 | 30 | 30 | 30 | 30 | 30 | 30 |
| θ | — | 60 | 60 | 60 | 60 | 60 | 60 | 60 | 60 | 60 | 60 | 60 |
| L3 | — | 70 | 70 | 70 | 70 | 70 | 70 | 70 | 70 | 70 | 70 | — |
| Heat dissipation effect | 100 | 114 | 115 | 115 | 114 | 114 | 113 | 113 | 113 | 111 | 111 | 110 |

Table 1 shows that in the Example tires having the wear prevention portion, the heat dissipation effect was maintained over a longer period of time than in the Comparative Example tires not having the wear prevention portion.

INDUSTRIAL APPLICABILITY

This disclosure thus provides a pneumatic tire that can improve the heat dissipation effect in the tread portion while guaranteeing land portion rigidity and that can also suppress degradation of the heat dissipation effect.

REFERENCE SIGNS LIST

1 Tread surface
2 Central circumferential groove
3 Intermediate circumferential groove
4 Outer circumferential groove
5 Intermediate width direction groove
6 Outer width direction groove
7 Rib-shaped central land portion
8 Block-shaped central land portion
9 Block-shaped outer land portion
10 Narrow groove
10c Groove wall of narrow groove
11 Air inflow part
11a Groove wall opening end of air inflow part
12 Wear prevention portion

The invention claimed is:

1. A pneumatic tire comprising:
   a narrow groove formed on a tread surface and extending in a direction inclined with respect to a tire circumferential direction, a width of the narrow groove being smaller than a depth of the narrow groove;
   an air inflow part, one end of the air inflow part opening to at least one of groove walls of the narrow groove that face each other in the tire circumferential direction, and another end of the air inflow part opening to the tread surface; and
   a wear prevention portion formed by a protrusion on a groove wall that faces a groove wall on which the air inflow part is formed or on the tread surface connecting to the groove wall that faces the groove wall on which the air inflow part is formed,
   wherein the air inflow part has a length of 5 mm or more along the longitudinal direction of the narrow groove and ½ or less of a length of the narrow groove along the longitudinal direction,
   at least one end of the narrow groove is a terminal end terminating in a land portion,
   the air inflow part is disposed only at the terminal end of the narrow groove, and
   the wear prevention portion is located to overlap the air inflow part in the tire circumferential direction, and wherein
   the wear prevention portion does not contact the groove wall on which the air inflow part is formed.

2. The pneumatic tire of claim 1, wherein the wear prevention portion is a protrusion that projects outward in a tire radial direction from the tread surface.

3. The pneumatic tire of claim 2, wherein as viewed in a cross-section in the tire circumferential direction, the protrusion that projects outward in the tire radial direction is shaped as an arc having a center of curvature inwards in the tire radial direction of the protrusion.

4. The pneumatic tire of claim 1, wherein the wear prevention portion is a protrusion that projects toward the air inflow part from the groove wall that faces the groove wall on which the air inflow part is formed.

5. The pneumatic tire of claim 1, wherein the wear prevention portion extends continuously along an extending direction of the narrow groove, and a length of the wear prevention portion along the extending direction of the narrow groove is 0.05 or more times a length of the air inflow part and is equal to or less than a length of the narrow groove.

6. The pneumatic tire according to claim 1, further comprising:
   a second air inflow part on the groove wall that faces the groove wall on which the air inflow part is formed, separated from the air inflow part in an extending direction of the narrow groove; and
   a second wear prevention portion formed by a protrusion or a concavity on the groove wall that faces the groove wall on which the second air inflow part is formed or on the tread surface connecting to the groove wall that faces the groove wall on which the second air inflow part is formed.

7. The pneumatic tire according to claim 1, wherein a height of the wear prevention portion, as measured from the groove wall on which the wear prevention portion is formed to a top of the wear prevention portion, is less than half of a groove width of the narrow groove.

* * * * *